United States Patent [19]

Sudbury et al.

[11] Patent Number: 4,457,855

[45] Date of Patent: Jul. 3, 1984

[54] STABLE HYPOCHLORITE SOLUTION SUSPENDABLE DYES

[75] Inventors: Barry A. Sudbury; Alfred G. Zielske, both of Pleasanton, Calif.

[73] Assignee: The Clorox Company, Oakland, Calif.

[21] Appl. No.: 271,159

[22] Filed: Jun. 8, 1981

[51] Int. Cl.³ .................. C01B 11/06; C11D 7/54; C11D 7/56

[52] U.S. Cl. .................. 252/98; 252/95; 260/378; 524/722

[58] Field of Search .......... 260/378, 42.21, 741, 260/756, 764; 252/95, 98

[56] References Cited

U.S. PATENT DOCUMENTS

| | | | |
|---|---|---|---|
| 3,393,153 | 7/1968 | Zimmerer et al. | 252/95 |
| 3,655,566 | 4/1972 | Robinson et al. | 252/95 |
| 3,663,442 | 5/1972 | Briggs | 252/95 |
| 3,666,680 | 5/1972 | Briggs | 252/95 X |
| 3,689,421 | 9/1972 | Briggs | 252/95 |
| 3,923,454 | 12/1975 | Genta | 260/42.21 X |
| 4,193,888 | 3/1980 | McHugh | 252/95 X |
| 4,202,815 | 5/1980 | Wegmann | 260/42.21 |

FOREIGN PATENT DOCUMENTS

| | | | |
|---|---|---|---|
| 1230438 | 5/1971 | United Kingdom | 252/95 |
| 1484643 | 9/1973 | United Kingdom | 252/95 |
| 1384907 | 2/1975 | United Kingdom | 252/95 |
| 1518569 | 7/1978 | United Kingdom | 252/95 |
| 1564189 | 4/1980 | United Kingdom | 252/95 |
| 1568836 | 6/1980 | United Kingdom | 252/95 |
| 1572353 | 7/1980 | United Kingdom | 252/95 |
| 1574824 | 9/1980 | United Kingdom | 252/95 |
| 1587210 | 4/1981 | United Kingdom | 252/95 |
| 1588270 | 4/1981 | United Kingdom | 252/95 |
| 1596988 | 9/1981 | United Kingdom | 252/95 |
| 1601083 | 10/1981 | United Kingdom | 252/95 |

Primary Examiner—Floyd D. Higel
Attorney, Agent, or Firm—Hubert E. Dubb

[57] ABSTRACT

This invention relates to dyes which are resistant to hypochlorite attack, exemplary of which are anthraquinone dyes of the general formula:

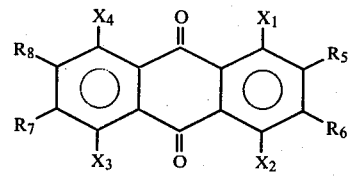

wherein $X_1$, $X_2$, $X_3$, $X_4$, $R_5$, $R_6$, $R_7$, and $R_8$ are defined within the specification. The invention also relates to hydrophobic latex particles, such as polyethylene, in which such dyes are deposited. A combined liquid bleaching and dyeing composition is disclosed which includes the aforementioned particles in hypochlorite liquid bleach at a pH above about 11. This composition has sufficiently long shelf life for the purposes of ordinary commerce.

9 Claims, No Drawings

STABLE HYPOCHLORITE SOLUTION SUSPENDABLE DYES

DESCRIPTION

1. Technical Field

This invention relates to certain novel dyes and to particles which contain such dyes and are suspendable in hypochlorite solution, and which exhibit sufficient shelf life to provide a combined liquid bleaching and bluing composition.

2. Prior Art

Liquid household bleach serves to remove colored impurities from fabrics by chemically oxidizing the impurities. Fabrics are also often "blued" whereby undesired color is rendered invisible by color compensation. Frequently this bluing results from a pigment which is deposited on the fabric. In some cases, particular dyes are used which serve as optical brighteners. The optical brighteners serve to compensate for the yellow cast in the fabric brought on by multiple laundering and is occasioned by absorption of short wave length light.

The conventional method of transferring optical brighteners or bluing agents to fabric is by adding the optical brighteners or bluing agents to the wash water along with the detergent. Generally, optical brighteners and bluing agents are not present in bleach, particularly liquid bleach, since the liquid bleach has a strong tendency to oxidize and destroy the dyes with concurrent reduction in bleaching strength. Alternate approaches involving addition of bleach stable inorganic pigments to liquid hypochlorite bleach to effect bluing have also been unsuccessful, generally because the pigment particles have a tendency to settle out of suspension.

When bleach and detergent (which contains such dyes) are used together in washing fabrics, it has been found that the bleach destroys significant amounts of the dye whereby the sum of the effects of the bleach and dye is significantly reduced.

One attempt to stabilize a dye in bleach is to incorporate the dye in polymer particles typically between 0.5 and 2 microns in average particle size, with the polymer particles having (1) an inner portion of the dye and a styrene-acrylic hydrophilic polymer and (2) an outer portion which forms an encapsulating layer over the inner portion and consists essentially of a hydrophobic styrene polymer which is free of the dye. Such particles are described in detail in U.S. Pat. No. 3,655,566, issued Apr. 11, 1972 to Ronald A. Robinson and Benjamin R. Briggs. It is clear that forming the polymer particles of this patent requires first forming the inner core and then forming the outer encapsulating layer about it. Such can significantly affect the price of the ultimate suspendable particles. Furthermore, the dyes still must be sufficiently stable to hypochlorous acid.

The present invention is directed to overcoming one or more of the problems as set forth above.

DISCLOSURE OF THE INVENTION

In accordance with one aspect of the present invention, a hypochlorite solution stable suspendable dye particle is set out which comprises a highly hydrophobic latex having a dye incorporated therein, the dye being selected to be resistant to attack by active chlorine species.

In accordance with another embodiment of the present invention, a combined liquid bleaching and dyeing composition is set out which comprises an aqueous hypochlorite containing solution and a plurality of such dye particles as described above dispersed therein.

In accordance with still another embodiment of the present invention, a dye of the anthraquinone series is set out which comprises:

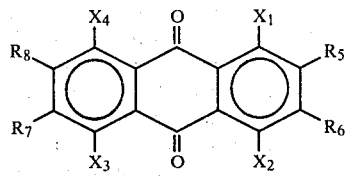

wherein $X_1$ is an amino auxochrome of the formula

and $X_2$, $X_3$ and $X_4$ are selected from hydrogens, alkyls, hydroxyls halogens and amino auxochromes of the formula

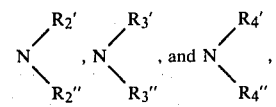

wherein $R_n'$ and $R_n''$, with n = 1, 2, 3 or 4, are selected from hydrogen, alkyl and aromatic substituents and $R_n'$ and $R_n''$ are not both hydrogens when part of the same amino auxochrome (for a particular value of n) and wherein at least one, and preferably both, of $R_5$ and $R_6$ are selected from chlorine, bromine, iodine, fluorine and alkyl substituents. When $X_3$ and/or $X_4$ are amino auxochromes, then at least one, and preferably both, of $R_7$ and $R_8$ are selected from chlorine, bromine, iodine, fluorine and alkyl substituents. When any of $R_5$, $R_6$, $R_7$ and $R_8$ are alkyl substituents, they are preferably lower alkyl substituents having no more than about five carbon atoms and are most preferably methyl substituents.

When operating in accordance with various of the embodiments of the present invention, a dye having relatively high resistance to hypochlorite attack, and more generally to hypochlorous acid attack, and having a desired color is obtained. The dye, particularly if it is suspended in a hydrophobic latex, has a shelf life, when suspended in a hypochlorite containing solution, most preferably a hypochlorite solution having a pH above about 11, which is acceptable for home product sale and use. And, the suspendable latex particles can be made in a single operation and do not require an outer shell of a protective polymer which is substantially free of dye.

BEST MODE FOR CARRYING OUT THE INVENTION

The present invention is based upon the development of a basic understanding as to the resistance of various dyes to attack by hypochlorite solution. Briefly, the dyes are modified to make them inherently more resistant than other dyes of the same series to attack by hypochlorite and the dyes are incorporated in a highly hydrophobic matrix to help shield them from actual contact with the hypochlorite. It has also been discovered, as a result of the basic understanding obtained of the hypochlorite-dye system, that the degradation of dyes by hypochlorite is significantly pH dependent. Thus, it has been found that if the pH is increased, from a normal 11.5 to above about 12, and more generally to about 12.5 or above, the lifetime of the dye, in hypochlorite solution, is very significantly improved.

It is theorized that the degradation of the dye in the polymer results from penetration of hypochlorous acid into the polymer. Hypochlorite ion is a negatively charged species and thus unable to penetrate the hydrophobic polymer. In essence, then, the points of probable attack of hypochlorous acid are blocked either by a substitution of appropriate chemical groups in the dye molecule, or by having adjacent groups be large enough so as to sterically hinder attack of the hypochlorous acid upon the vulnerable positions of the dye molecule. Of course, one can both chemically block the sites of probable attack and provide adjacent blocking groups which are sufficiently large to sterically hinder hypochlorous acid from attacking these positions.

It is also theorized that aromatic substituents on the amino auxochrome deactivate the parent anthraquinone ring to attack by hypochlorous acid while becoming themselves more susceptible to such attack. In this way, the aromatic substituents scavenge hypochlorous acid and, most unexpectedly, chlorination of these groups causes only small changes in the spectral properties of the dye. Thus, no noticeable color change results.

While in no way limiting the invention or being bound by the just stated theory, hereinafter dyes as modified herein will be described as being hypochlorous acid attack resistant. Finally, the modified dyes must not only be hypochlorous acid attack resistant, but must also be of a desired color. Generally, the dyes will be blue to provide bluing, but it is also possible to have them be optical brighteners, or if desired, the dyes can be red or any other color.

METHOD OF INCORPORATING DYE IN LATEX

In one method of incorporating the dye in the latex, the dye is dissolved in an organic solvent, for example, xylene, toluene, or hexane, by heating the organic solvent-dye mixture to about 50° C. The organic solvent, with the dye in it, is then mixed with a latex emulsion polymer until the dye is transferred from the solvent to the latex particles and the organic solvent is distilled off. If the solvent is xylene or toluene, the distillation temperature is about 80°-90° C. If the solvent is hexane, it can be removed by heating the mixture at about 60°-70° C. Generally, the solution is stirred with a magnetic stirring bar during the removal of the organic solvent. Removal of the aromatic solvent usually requires over 12 hours whereas aliphatic solvents, e.g., hexane, can generally be removed in 3 to 4 hours.

Alternatively, a surfactant can be used to carry the dye into the polymer. The procedure involves mixing the surfactant, the dye and the polymer emulsion and stirring the resultant combination for 1-48 hours while maintaining the temperature in the range from about 40° C. to above the glass transition temperature of the polymer. Selected anionic, cationic and nonionic surfactants have been successfully used in this procedure and it is expected that any surfactant or mixture thereof which aids in the solubilization of the dye in water will be effective.

Still another method of depositing the dye in the polymer is available. This method involves addition of the dye during the synthesis of the polymer from its monomeric units. Proper choice of dye and polymer will result in a homogenous pigment with acceptable dye stability.

Effect of pH

It has been found that the rate constant for decolorization of the dye incorporated in the latex matrix is significantly reduced at higher pHs. For example, Table 1 shows the rate constants for dye decolorization from data analysis based on the following expression:

$$-\frac{d[\text{dye}]}{dt} = k[\text{dye}]^2 [\text{OCl}],$$

where [dye] is the concentration of dye in the polymer, and [OCl] is the concentration of hypochlorite ion in the aqueous solution.

TABLE I
THE EFFECT OF pH ON THE
RATE OF DYE DECOLORIZATION

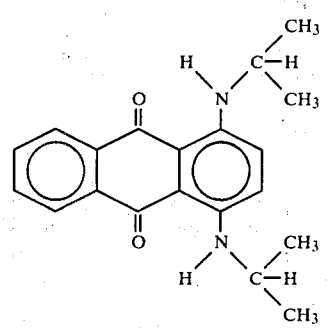

| Dye | $k\left(\frac{\text{liters}}{\text{moles}^2\text{hr}}\right)$ 100° F. | | |
|---|---|---|---|
| | pH | | |
| | 11.5 | 12.0 | 12.5 |
| (structure 1) | 1.29 | 0.50 | 0.22 |
| | pH | | |
| | 11.3 | 11.8 | 12.2 |
| (structure 2) | 0.23 | 0.13 | 0.06 |

The Hydrophobic Latex

It is important that the latex material utilized be highly hydrophobic in nature. Polystyrene latices and polystyrene latices with surface copolymerized acrylic acids such as methacrylic acid, are particularly useful latex materials. Polyvinyl chloride latices are also useful. One particularly useful polystyrene latex which was utilized was supplied by the Dow Chemical Company under the tradename Dow Plastic Pigment 722. It consists of polystyrene particles approximately 0.5 micron in diameter stabilized by an anionic surfactant.

Generally, the latices which can be utilized include those which:

(1) accept the dye of interest;
(2) are hydrophobic enough to exclude hypochlorite ion and at least partially exclude hypochlorous acid molecules to a sufficient extent;
(3) do not swell in an aqueous environment that is basic, acidic or neutral; and
(4) do not become substantially more hydrophilic upon storage in basic hypochlorite.

To guard against sedimentation, it is desirable that the latex consist of particles less than 2.5 microns in diameter and be of nearly the same density as that of the solution in which it is suspended.

Anthraquinone Series Dyes

In accordance with the present invention, it has been found that anthraquinone series dyes of the formula:

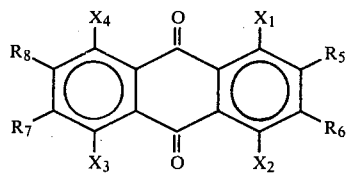

wherein $X_1$ is an amino auxochrome of the formula

and $X_2$, $X_3$ and $X_4$ are selected from hydrogens, alkyls, halogens, hydroxyls, and amino auxochromes of the formulas:

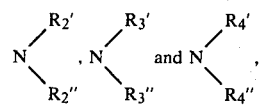

wherein $R_n'$ and $R_n''$, with n=1, 2, 3 or 4, are selected from hydrogen, alkyl and aromatic substituents and $R_n'$ and $R_n''$ are not both hydrogens when part of the same amino auxochrome and wherein $R_5$, $R_6$, $R_7$ and $R_8$ are selected from hydrogen, chloride, bromine, iodine, fluorine and alkyl substituents, are relatively highly resistant to attack by hypochlorous acid. It has been found that it is preferred that $R_5$ and $R_6$ are not hydrogens and similarly when $X_3$ and/or $X_4$ are amino auxochromes, it is preferred that $R_7$ and $R_8$ are not hydrogens. It is also preferred that if $R_n'$ and $R_n''$ are aliphatic substituents, the carbons adjacent to the nitrogen are not bonded to hydrogens. It is further preferred that $R_n'$ and $R_n''$ contain an aromatic substituent bonded directly to the nitrogen.

EXAMPLE

The rate constants for dye decolorization, as defined previously, were determined for a series of dyes containing various structural modifications. Measurements were made in hypochlorite solutions having a hypochlorite concentration of approximately 0.8M at a pH of 12.2 and at a temperature of approximately 37.8° C., (100° F.). Each of the dyes had been identically incorporated into a highly hydrophobic latex, in particular, a polystyrene latex, by dissolving the dye in a n-hexane or toluene and heating above 70° C., with stirring, for 2–48 hours.

Table 2 illustrates the importance of protecting the 2 and 3 positions of the anthraquinone ring. Thus, dyes with methyl for $R_5$ and $R_6$ are more stable (have a smaller k) than similar dyes with hydrogens for $R_5$ and $R_6$.

TABLE 2

THE EFFECT OF BLOCKING RING POSITIONS ADJACENT TO AMINO AUXOCHROMES ON THE RATE OF DYE DECOLORIZATION

| Dye | $k\left(\dfrac{\text{liters}^2}{\text{moles}^2\text{hr}}\right)$, T = 100° F., pH = 12.2 |
|---|---|
| 1,4-bis(isopropylamino)anthraquinone | 0.93 |
| 1,4-bis(neopentylamino)anthraquinone | 1.46 |
| 1,4-bis(t-butylamino)anthraquinone | 0.72 |
| 1,4-bis(isopropylamino)-2,3-dimethylanthraquinone | 0.17 |
| 1,4-bis(neopentylamino)-2,3-dimethylanthraquinone | 0.26 |

TABLE 2-continued
THE EFFECT OF BLOCKING RING POSITIONS ADJACENT TO AMINO AUXOCHROMES ON THE RATE OF DYE DECOLORIZATION

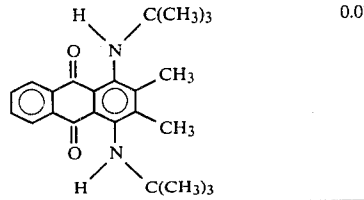  0.07

Table 3 shows the importance of having no hydrogens on the carbon atom of the substituent attached to the nitrogen atom. Thus, dyes with no hydrogen alpha to the nitrogens of the amino auxochrome are more stable than dyes with such hydrogens.

TABLE 3
THE EFFECT OF HYDROGEN ATOMS BONDED TO THE ALPHA CARBON OF THE AMINO AUXOCHROME ON THE RATE OF DYE DECOLORIZATION

| Dye | $k\left(\dfrac{\text{liters}^2}{\text{moles}^2\text{hr}}\right)$ T = 100° F., pH = 12.2 |
|---|---|
| 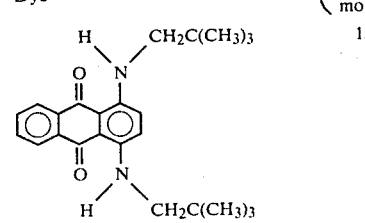 | 1.46 |
| 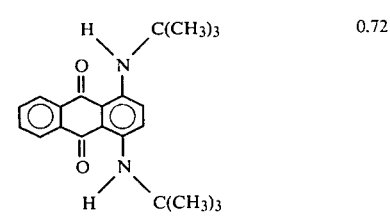 | 0.72 |
| 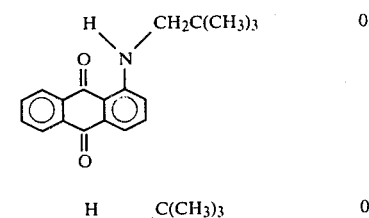 | 0.10 |
| 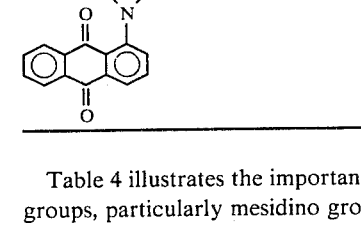 | 0.03 |

Table 4 illustrates the importance of having aromatic groups, particularly mesidino groups, attached directly to the nitrogen atoms. Thus, dyes with aromatic groups bonded directly to the nitrogen of the amino auxochrome are more stable than similar dyes without this structural feature.

TABLE 4
THE EFFECT OF AROMATIC VERSUS ALIPHATIC SUBSTITUTION IN THE AUXOCHROME ON THE RATE OF DYE DECOLORIZATION

| Dye | $k\left(\dfrac{\text{liters}^2}{\text{moles}^2\text{hr}}\right)$ T = 100° F., pH = 12.2 |
|---|---|
| 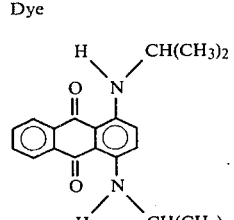 | 0.93 |
| 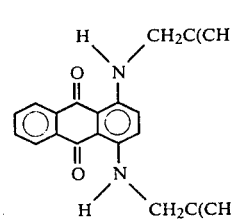 | 1.46 |
| 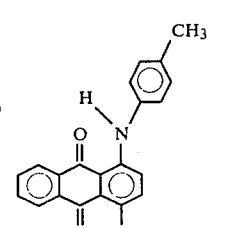 | 0.04 |
| 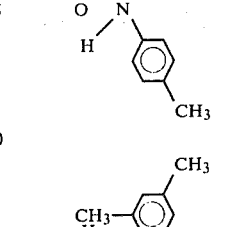 | 0.06 |
| 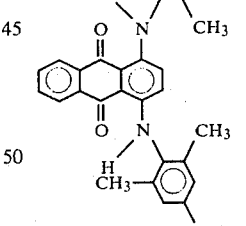 | 0.02 |

TABLE 4-continued

THE EFFECT OF AROMATIC VERSUS ALIPHATIC SUBSTITUTION IN THE AUXOCHROME ON THE RATE OF DYE DECOLORIZATION

[Structure: anthraquinone with OH groups and N-aryl (trimethylphenyl) substituents]  0.01

Table 5 illustrates the importance of not having two hydrogen atoms bonded to the nitrogen of an amino auxochrome. Thus, dyes with two hydrogen atoms bonded directly to the nitrogen of an amino auxochrome are less stable than dyes containing only one hydrogen bonded to the nitrogen of an amino auxochrome.

TABLE 5

THE EFFECT OF ALKYL SUBSTITUENTS IN THE AMINO AUXOCHROME ON THE RATE OF DYE DECOMPOSITION

| Dye | $k\left(\dfrac{\text{liters}^2}{\text{mole}^2\text{hr}}\right)$, T = 100° F., pH = 12.2 |
| --- | --- |
| 1-amino anthraquinone | 0.13 |
| 1-(N-methylamino) anthraquinone | 0.07 |
| 1,4-diamino anthraquinone | 1.15 |
| 1,4-bis(N-methylamino) anthraquinone | 0.72 |

Synthesis of Substituted Anthraquinone Dyes

The novel 2,3 substituted anthraquinone dyes of the invention can by synthesized in a generally straightforward manner as will be seen from the following example of the synthesis of 2,3 dimethyl substituted anthraquinones.

Quinizarin was reduced with sodium hydrosulfite in aqueous basic (sodium hydroxide) solution. The hydrosulfite was used in a three to one molar ratio to the quinizarin. The resulting leuco-quinizarin was heated at 90° C. in about a two-fold molar excess of formaldehyde for one hour and then further heated in air at 90° C. for one hour. The resulting product was 2,3-dimethylquinizarin.

The 2,3-dimethylquinizarin was dissolved in methylene chloride solvent along with a two and one half times molar excess of tosyl chloride. A basic (sodium hydroxide) aqueous solution of tetrabutyl ammonium bromide was formulated. The methylene chloride solution and the basic aqueous solution were vigorously agitated together at room temperature for about 2 hours. The resulting product was 1,4-ditosyl-2,3-dimethylanthraquinone.

The 1,4-ditosyl-2,3-dimethylanthraquinone was next dissolved in pyridine solvent and reacted with a primary or secondary amine for two to eighteen hours (depending upon the amine) at a temperature of 60° C. to 100° C. The tosyl groups were thereby converted to amine auxochromes.

Industrial Applicability

The dyes of the present invention are particularly useful when incorporated in a hydrophobic matrix and suspended in liquid hypochlorite bleach. The bleaching-bluing agent (dye) combination can be added to a washing machine in the normal manner that bleach is added. Both efficient bleaching and efficient bluing take place since neither the hypochlorite concentration nor the dye concentration is significantly reduced through interaction of the one with the other during storage or during the wash cycle. The product can be stored on the shelf for relatively long periods of time, particularly when the pH of the product is above about 12, and more preferably is about 12.5. Thus, the product does not have to be removed from the shelves often. Furthermore, it is not necessary to form any type of a protective external layer about the dye-including latex particles to obtain the desired storability, thereby keeping the cost of producing the bleaching-bluing product down. Furthermore still, the particles can have their density tailored so as to be stably suspendable. Thereby, the product can be designed with no need for shaking or mixing prior to use.

While the invention has been exemplified in terms of the preferred anthraquinone series of dyes, the principles of the invention may be extended to other dye series, such as the coumarin series, as well.

Other aspects, objects and advantages of this invention can be obtained from a study of the disclosure and the appended claims.

We claim:

1. A hypochlorite solution stable suspendable dye particle, comprising a highly hydrophobic latex having a hydrophobic dye incorporated therein, said dye being selected to be resistant to hypochlorous acid attack.

2. A particle as set forth in claim 1 wherein said dye is of the anthraquinone series and has the formula:

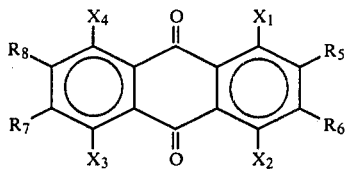

wherein $X_1$ is an amino auxochrome of the formula

and $X_2$, $X_3$ and $X_4$ are selected from hydrogens, alkyls, halogens, hydroxyls, and amino auxochromes of the respective formulas

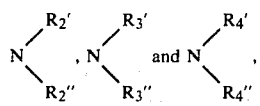

wherein $R_n'$ and $R_n''$ with n=1, 2, 3, or 4, are selected from hydrogen, alkyl and aromatic substituents and $R_n'$ and $R_n''$ are not both hydrogens when part of the same amino auxochrome and wherein $R_5$, $R_6$, $R_7$ and $R_8$ are selected from hydrogen, chlorine, bromine, fluorine and alkyl substituents.

3. A particle as set forth in claim 2, wherein at least one of $R_5$ and $R_6$ is not hydrogen.

4. A particle as set forth in claim 2 or claim 3, wherein $R_n'$ and $R_n''$ are selected such that there are no carbons bonded to both a hydrogen and the nitrogen in the amino auxochrome.

5. A particle as set forth in claim 2 or claim 3, wherein $R_n'$ or $R_n''$, for a particular amino auxochrome, is an aromatic group bonded directly to the nitrogen of the amino auxochrome.

6. A particle as set forth in claim 2, wherein $X_1$ and $X_2$ are both mesidino groups and $X_3$, $X_4$, $R_5$, $R_6$, $R_7$ and $R_8$ are hydrogens, alkyl or halogen groups.

7. A particle as set forth in claim 2, wherein $X_1$ and $X_3$ are both mesidino groups, $X_2$ and $X_4$ are hydroxyls, and $R_5$, $R_6$, $R_7$ and $R_8$ are hydrogens, alkyl or halogen groups.

8. A liquid bleach composition comprising:
an aqueous hypochlorite containing solution; and
a plurality of hypochlorite stable particles suspended in said solution, said particles comprising a highly hydrophobic latex having a hydrophobic dye incorporated therein, said dye being selected to be resistant to hypochlorous acid attack and said particles being selected to impart color and/or opacity to the solution.

9. A composition as set forth in claim 8 wherein said dye is of the anthraquinone series and has the formula:

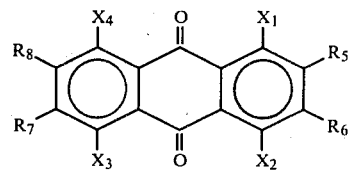

wherein $X_1$ is an amino auxochrome of the formula

and $X_2$, $X_3$ and $X_4$ are selected from hydrogens, alkyls, halogens, hydroxyls, and amino auxochromes of the respective formulas

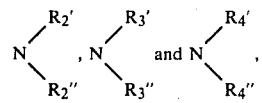

wherein $R_n'$ and $R_n''$ with n=1, 2, 3 or 4, are selected from hydrogen, alkyl and aromatic substituents and $R_n'$ and $R_n''$ are not both hydrogens when part of the same amino auxochrome and wherein $R_5$, $R_6$, $R_7$ and $R_8$ are selected from hydrogen, chlorine, bromine, fluorine and alkyl substituents.

* * * * *